Figure 1:
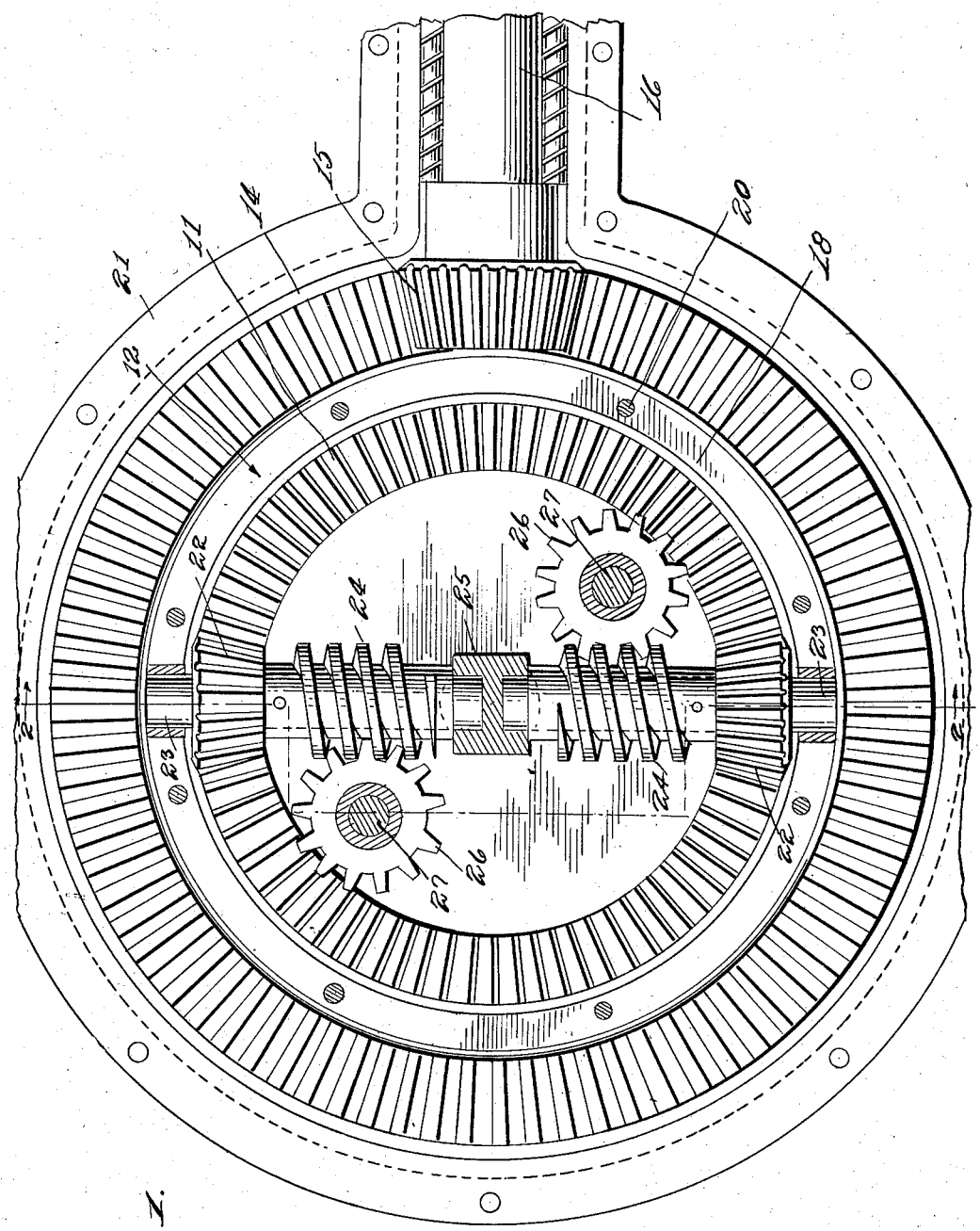

Sept. 9, 1930.    W. D. HEAP    1,775,312
DIFFERENTIAL MECHANISM
Filed April 16, 1930    2 Sheets-Sheet 1

Inventor
W. D. Heap.
By Lacey & Lacey,
Attorneys

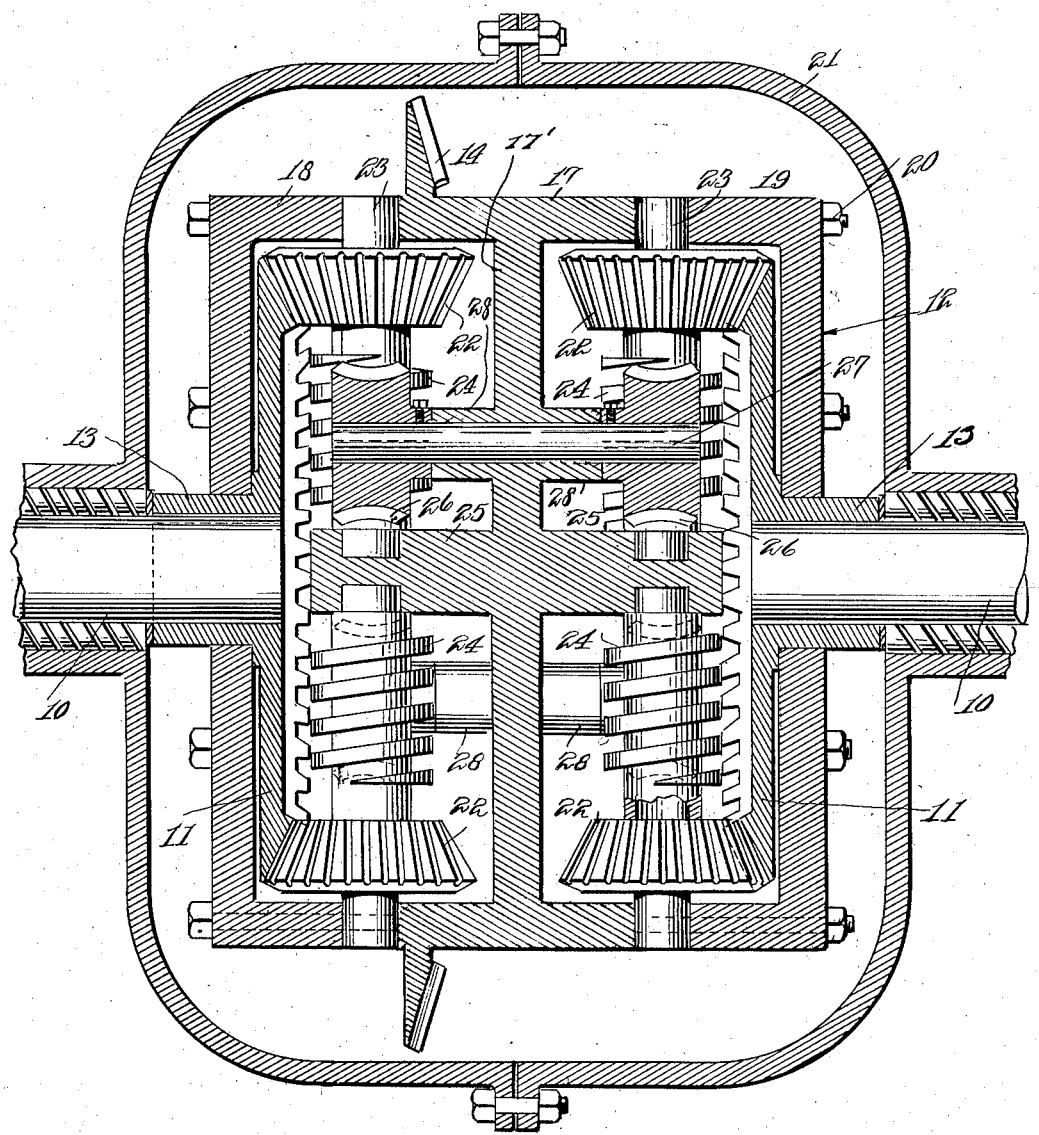

Patented Sept. 9, 1930

1,775,312

UNITED STATES PATENT OFFICE

WILLIAM D. HEAP, OF MISHICOT, WISCONSIN

DIFFERENTIAL MECHANISM

Application filed April 16, 1930. Serial No. 444,810.

This invention relates to differential mechanism and has for an object to provide an improved differential transmission for motor propelled vehicles.

The invention is more particularly adapted for use in connection with heavy slow-moving motor propelled vehicles such as tractors, and has for a further object to provide novel mechanism whereby the transmission is self-locking, that is the transmission will differentially drive two traction wheels in turning corners or in deviating from a straight line travel but will positively prevent one of the traction wheels spinning even if such wheel be entirely lifted from the ground.

A still further object of the invention is to provide an automatic self-locking differential gearing which will be extremely simple and inexpensive in construction and will be formed of a few strong durable parts which will not easily get out of order.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the acompanying drawings forming part of this specification,

Figure 1 is a longitudinal sectional view of a differential gearing embodying my improvements, and Figure 2 is a cross-sectional view taken on the line 2—2 of Figure 1.

Referring now to the drawings in which like characters of reference designate similar parts in the various views, 10 indicates axially aligned axle sections or shafts and to the confronting inner ends of these shafts are secured beveled gears 11. A rotatable member 12 encloses said gears and is mounted for rotation on the hubs 13 thereof, and is provided with a master beveled gear 14 which meshes with a pinion 15 on the engine driven or driving shaft 16. The member 12 forms the driving element of the differential mechanism and is preferably formed of three sections, a center section 17 and end sections 18 and 19, the sections being removably secured together by bolts 20. A housing 21 encloses the rotatable member.

The above mentioned beveled gears 11 mesh with beveled planetary pinions 22 which are mounted on radially disposed shafts 23 the outer ends of which are journaled in the circumferential wall of the rotary member 12. The inner ends of the shafts are provided with worms 24 and are terminally journaled in bearings 25 formed integral with the web 17' of the center section 17 of the rotary member, and disposed in alignment with the shafts 10.

The worm shafts 23 are arranged in multiple or in sets as shown best in Figure 2 and the transversely opposite worm gears which lie on the same side of the center line of the shafts 10 mesh with worm pinions 26 arranged on a common shaft 27 which extends parallel with the aligned shafts 10, and is journaled intermediate the ends in bearings 28 which are integral with the above mentione web of the rotary member.

The differential action produced through the worm pinions 26 in turning corners with both wheels on the ground is substantially the same as that in an ordinary differential since the shaft 27 is free to turn when the worm pinions 26 rotate in the same direction as will presently be more fully described.

However, said worm pinions 26 will instantly and automatically concentrate the driving force on a wheel which is free or offers relatively little resistance so that it will not be caused to spin ahead of the wheel that is firmly set upon the ground or has good traction with the ground. This is accomplished by virtue of the fact that the tendency of the free wheel to speed up will tend to cause the worm pinions 26 to rotate in opposite directions but this will be impossible since the worm pinions are fixed on a common shaft 27 and one cannot rotate opposite to the other. Consequently, both worm shafts 23 will be locked against rotation so that the shafts 10 rotate at the same rate of speed.

Although the present embodiment of the invention illustrates two sets of worm gears 24 and corresponding worm pinions it is not intended to limit the invention to this construction since a single set of these parts may be used effectively it being understood, however, that where but a single set is used it is desirable to employ a counter-weight diametrically opposite the set on the rotary member 12 to counter-balance the weight of the parts.

It will be pointed out that in tractors one of the wheels will virtually be turning backward while the other is turning forward in making a sharp turn and the differential action of this gearing as above outlined will be easily understood by referring to Figure 2. When one of the wheels is turning backward and the other turning forward the beveled pinions 22 will be turning in the same direction with the result that the worms 24 turn the worm pinions 26 in the same direction. This may be continued indefinitely since both worm pinions are on the same shaft.

However, when any condition arises wherein one worm pinion 26 will have a tendency to be turned in an opposite direction to the mating worm pinion, the parts will automatically lock since both worm pinions are on the same shaft 27 and consequently can never turn in opposite directions. This condition arises as for instance when one of the shafts 10 tends to speed up as for instance when the traction wheel carried thereby is lifted from the ground.

Having thus described the invention, I claim:

1. The combination with a differential gearing including a rotary driven member, aligned shafts, beveled gears on said shafts housed by said member, planetary beveled pinions carried by said member and meshing with said beveled gears, of a transverse shaft carried by said rotary member and having worm and pinion connections with said planetary pinions, and operating to lock said planetary pinions against opposite rotation on the axes thereof whereby to lock said member to said beveled gears.

2. The combination with a differential gearing including beveled gears and planetary pinions meshing therewith, of a driven member carrying said pinions and housing said gears, parallel radially disposed worm gears driven by said planetary pinions and carried by said member, and a transverse shaft carried by said member having worm pinions meshing with said worm gears and operating to lock said planetary pinions against rotation on their axes in opposite directions.

3. The combination with aligned shafts, of a transmission mechanism comprising a master gear driven rotary member, beveled gears on the ends of said shafts, planetary pinions carried by said rotary member and meshing with said beveled gears, and worm and pinion devices operatively connecting said planetary pinions and said rotary member and locking said planetary pinions against rotary movement in opposite directions on the axes thereof, said devices permitting rotation of said pinions in the same direction on the axes thereof.

4. The combination with aligned shafts, of a transmission mechanism comprising a master gear driven rotary member, beveled gears on the ends of said shafts housed within said rotary member, a pair of parallel radially disposed worm gears carried by said member and adapted to be driven in the same direction by said planetary pinions, a transverse shaft carried by said rotary member and disposed parallel with said aligned shafts, and worm pinions on the ends of said transverse shaft meshing with said worm gears, said transverse shaft and said worm pinions preventing rotation of said worm pinions in opposite directions whereby to lock said member to said beveled gears.

5. The combination with aligned shafts, of a transmission comprising a master gear driven rotary member, beveled gears on the ends of said shafts, said rotary member having a centrally disposed web, a pair of radially disposed stub shafts journaled in the circumferential wall of said rotary member and extending parallel with and on opposite sides of said web, planetary pinions fixed to said stub shafts and meshing with said beveled gears, worm gears on said stub shafts, a transverse shaft journaled intermediate the ends in said web and extending parallel with said aligned shafts, and worm pinions on the ends of said transverse shaft meshing with said worm gears.

In testimony whereof I affix my signature.

WILLIAM D. HEAP. [L. S.]